United States Patent [19]

Kimura et al.

[11] Patent Number: 4,532,298

[45] Date of Patent: Jul. 30, 1985

[54] COMPRESSION-RESISTANT WATER-SWELLABLE RUBBER COMPOSITION AND WATERTIGHT SEALING MATERIAL COMPRISING THE SAME

[75] Inventors: Toshihiro Kimura, Ageo; Kazuhiro Takasaki, Warabi; Hiroshi Harima; Yoshihiro Yoshioka, both of Ibaraki, all of Japan

[73] Assignees: C. I. Kasei Co. Ltd., Tokyo; Kuraray Isoprene Chemical Co. Ltd., Ibaraki, both of Japan

[21] Appl. No.: 577,355

[22] Filed: Feb. 6, 1984

[30] Foreign Application Priority Data

Feb. 8, 1983 [JP] Japan ................................ 58-19044

[51] Int. Cl.$^3$ ............................................ C08L 53/00
[52] U.S. Cl. .................................... 525/96; 525/108; 525/196; 525/210; 525/215
[58] Field of Search ............... 525/215, 196, 210, 108, 525/96

[56] References Cited

U.S. PATENT DOCUMENTS

| | | | |
|---|---|---|---|
| 2,832,746 | 4/1958 | Jackson | 525/108 |
| 3,933,719 | 1/1976 | Iwai et al. | 525/215 |
| 4,211,851 | 7/1980 | Szsayama | 525/108 |
| 4,342,843 | 8/1982 | Perlinski et al. | 525/108 |

*Primary Examiner*—Jacob Ziegler
*Attorney, Agent, or Firm*—Brisebois & Kruger

[57] ABSTRACT

The invention provides a novel watertight rubbery sealing material of which the water-swellability is markedly insusceptible to the adverse influence of compression of the material in a dry condition. The watertight sealing material is a shaped and vulcanized body of a water-swellable rubber composition comprising, in a limited proportion, (a) a chloroprene rubber, (b) a highly water-absorptive resin such as a crosslinked polyacrlylic acid in the form of a sodium salt, (c) a rubbery polymer unvulcanizable with a metal oxide-based vulcanizing agent and (d) a metal oxide-based vulcanizing agent which is preferably a combination of magnesium oxide and zinc oxide.

12 Claims, No Drawings

COMPRESSION-RESISTANT WATER-SWELLABLE RUBBER COMPOSITION AND WATERTIGHT SEALING MATERIAL COMPRISING THE SAME

BACKGROUND OF THE INVENTION

The present invention relates to a water-swellable crosslinked rubber conposition of which the swelling ratio with water is markedly insusceptible to compression of the material in a dry condition. More particularly, the invention relates to a water-swellable crosslinked rubbery composition comprising a blend of a chloroprene rubber and a highly water-absorptive resin as the essential components, of which the swelling ratio with water is little affected by the compression of the composition in a dry condition.

Water-swellable rubber compositions, as a class of newly developed products in recent years, are widely used as a sealing material in various portions of structured bodies where watertight sealing is required such as the sealing material for metal-, e.g. steel-made structured bodies, prefabricated culvert boxes, sealed segments, joints formed in the assembly of precast concrete bodies, construction joints and the like as well as a sealing material for repairing of structured bodies. In particular, it is taught in Japanese Patent Kokai No. 57-108143 that a very useful watertight sealing material is obtained with a composition prepared by dispersing a highly water-absorptive resin in a 1,3-diene-based synthetic rubber containing 5 to 50% of the crystalline or glassy region or, preferably, a chloroprene rubber containing 15 to 35% of the crystalline region, which rapidly absorbs water to give a high swelling pressure.

The watertight sealing material of this type, however, has a serious problem that, when the material undergoes a compressive deformation of 30% or larger in a dry condition, for example, in the course of construction of the structured body, the capacity of the material for the absorption of water is remarkably reduced so that the desired watertight sealing effect cannot be fully exhibited thereby to greatly limit the applicability of such a material.

Accordingly, it has been eagerly desired to develop a novel and improved watertight sealing material free from the above described problem in the prior art sealing materials or, in particular, a water-swellable rubbery composition which is insusceptible to compression in a dry condition capable of fully exhibiting the swelling capacity with water when released from the compression.

SUMMARY OF THE INVENTION

An object of the present invention is therefore to provide a novel and improved watertight sealing material formed of a water-swellable rubbery composition which is markedly insusceptible to the influence of compression in a dry, i.e. unswollen, condition in respect of the capacity of swelling with water when the compressive force is released.

Another object of the invention is to provide a novel water-swellable rubbery composition which can be shaped into a watertight sealing material free from the problems and disadvantages in connection with the above mentioned adverse influence of compression in a dry condition.

Thus the water-swellable rubbery composition of the invention suitable for shaping into a watertight sealing material comprises:

(a) 100 parts by weight of a chloroprene rubber;
(b) from 5 to 300 parts by weight of a highly water-absorptive resin capable of absorbing water to give a swelling ratio of, preferably, 10 to 500 by weight;
(c) from 3 to 100 parts by weight of a rubbery polymer unvulcanizable with a metal oxide vulcanizing agent; and
(d) a metal oxide vulcanizing agent which is, preferably, a combination of magnesium oxide and zinc oxide.

The watertight sealing material of the present invention free from decrease in the water-swellability by compression in a dry condition is obtained by shaping the above defined water-swellable rubbery composition into a desired form which is then heated, preferably, under a pressure to effect vulcanization of the polymeric components in the composition.

DETAILED DESCRIPTION OF THE PREFERRED EMBODIMENTS

The component (a) in the inventive water-swellable rubbery composition is a chloroprene rubber. As is well known, a chloroprene rubber is a polymer obtained by the emulsion polymerization of chloroprene in an aqueous medium and any one of the unmodified and the sulfur-modified products commercially available on the market can be used without particular limitations.

The component (b), which is referred to as a high-swelling resin hereinbelow, is a highly water-absorptive resin capable of being swollen with water to give a swelling ratio of 10 to 500 or, preferably, 20 to 300 by weight. When the water-swellability of this component is smaller than the above mentioned range, the resultant rubbery composition naturally has an insufficient water absorptivity while an excessively large water-swellability of the resin results in an unduly low mechanical strength of the resultant rubbery composition when swollen with water so that a watertight sealing material prepared of such a rubbery composition cannot exhibit desired full power of watertight sealing.

Various classes of hydrophilic polymers can be used as the component (b) including the starch-polyacrylate resins, polyacrylates prepared by the reversed phase polymerization of acrylic acid in an organic solvent, reaction products of a polyacrylic acid or a copolymer of maleic anhydride with a basic reactant and the like although a commercially available product of these resins should be subjected to a subsequent crosslinking treatment. Particularly suitable high-swelling resins, however, are those obtained by the crosslinking reaction of a polymer containing, as the monomeric component, an α,β-unsaturated ethylenic monomer having 1 or 2 of carboxyl groups or groups convertible to carboxyl groups in view of the water-absorptivity and the durability of the rubbery composition formulated with the high-swelling resin.

The groups convertible to carboxyl groups above mentioned include, for example, a residue of a carboxylic acid salt, residue of a carboxylic acid amide, residue of a carboxylic acid imide, residue of a carboxylic acid anhydride, nitrile group and the like. Further, the α,β-unsaturated ethylenic monomer having 1 or 2 carboxyl groups or above mentioned related groups is exemplified by acrylic acid, methacrylic acid, acrylamide, methacrylamide, maleic anhydride, maleic acid, maleic acid amide, maleic acid imide, itaconic acid, crotonic acid, fumaric acid and the like. These compounds may be used either singly or as a combination of two kinds or more according to need or as copolymerized with other copolymerizable monomer or monomers.

The above mentioned copolymerizable monomers are exemplified by ethylene, propylene, isobutylene, 1-butylene, diisobutylene, methyl vinyl ether, styrene, vinyl acetate, acrylic esters, methacrylic esters, acrylonitrile, vinyl chloride, vinylidene chloride and the like. When these monomer or monomers are copolymerized with the above mentioned $\alpha,\beta$-unsaturated ethylenic compound having carboxyl groups or those groups convertible to carboxyl groups, the proportion of these non-carboxyl comonomers in the monomer mixture should preferably be 70% by moles or smaller.

The polymerization of these monomers can be performed by use of a free radical polymerization initiator according to the conventional procedure for the free radical polynerization of vinylic monomers. Though not particularly limitative, the degree of polymerization of the thus obtained polymer should preferably be in the range from 10 to 5000. Particularly suitable polymers as the component (b) include polyacrylic acid, polymethacrylic acid and copolymers of maleic anhydride with an $\alpha$-olefin or a vinylic compound. These polymers or copolymers are desirably converted to a hydrophilic form by the reaction with a basic compound such as a compound of an alkali metal or alkaline earth metal, e.g. sodium, potassium, magnesium, calcium and barium, ammonia, amine and the like. The reaction to impart hydrophilicity can be performed by adding the polymer or copolymer into an aqueous solution containing the above mentioned basic compound dissolved therein under agitation. The basic compound to be reacted with the carboxylic polymer or copolymer is preferably sodium hydroxide, potassium hydroxide or ammonia from the standpoint of the reactivity and the durability of the high-swelling resin obtained by the reaction followed by crosslinking.

The polymer or copolymer having been imparted with hydrophilicity by the reaction with a basic compound is then subjected to crosslinking by the reaction with a crosslinking agent. Among the suitable crosslinking agents including polyvalent epoxy compounds, polyamines, polyhydric alcohols, amino alcohols, polyisocyanates, polyvalent halohydrine compounds, polyvalent aziridine compounds and the like, particularly preferable are polyvalent epoxy compounds and polyamines. The compound of the former class is exemplified by glycerin diglycidyl ether, ethyleneglycol diglycidyl ether, glycerin triglycidyl ether, polyethyleneglycol diglycidyl ether, propyleneglycol diglycidyl ether and trimethylolpropane triglycidyl ether. The compound of the latter class is exemplified by ethylene diamine, diethylene triamine, triethylene tetramine, tetraethylene pentamine and pentaethylene hexamine as well as polyethylene imines having a molecular weight not exceeding 5000.

The crosslinking reaction of the carboxylic polymer or copolymer with the above named crosslinking agent is performed by admixing the crosslinking agent with the polymer or copolymer followed, if necessary, by heating. It is optional to use a solvent in carrying out this crosslinking reaction according to need. When a polyvalent epoxy compound or a polyamine is used as the crosslinking agent, a convenient and advantageous way is the direct addition of the crosslinking agent to the reaction mixture after the reaction of the polymer or copolymer with the basic compound to effect the crosslinking reaction followed by separation of the reaction product which is dried and further subjected to a heating treatment. It is of course in this case that the amount of the crosslinking agent and the reaction conditions should be determined to control the degree of crosslinking so that the resultant crosslinked high-swelling resin may have a desired ratio of water absorption or swelling ratio.

When the thus prepared high-swelling resin has a relatively small capacity of water absorption, the resultant water-swellable rubbery composition cannot exhibit sufficiently high expansion when swollen with water while a high-swelling resin having an excessively large capacity of water absorption has poor mechanical strengths when swollen with water so that the resultant water-swellable rubber composition cannot give a sufficiently large swelling pressure. Accordingly, the watertight sealing material prepared by use of such a high-swelling resin having a too small or too large capacity for water absorption has an unsatisfactory power of watertight sealing. In this regard, it is preferable that the above prepared high-swelling resin should have a capacity of water absorption in the range from 10 to 500 times by weight or, more preferably, in the range from 20 to 300 times by weight.

Following are several examples of the high-swelling resins satisfactory as the component (b) in the inventive water-swellable rubber composition.

(1) A crosslinked resin of a reaction product of a copolymer of maleic acid or a maleic acid derivative such as maleic anhydride, maleic acid amide and maleic acid imide and a straight-chain or branched-chain $\alpha$-olefin having 2 to 12 or, preferably, 2 to 8 carbon atoms in a molecule such as ethylene, propylene, butylene, isobutylene and diisobutylene with a basic compound to impart hydrophilicity.

(2) A crosslinked resin of a reaction product of a copolymer of maleic acid or a maleic acid derivative and a vinyl or vinylidene monomer such as styrene, vinyl acetate, methyl vinyl ether, acrylic esters, methacrylic esters and acrylonitrile with a basic compound to impart hydrophilicity.

(3) A crosslinked resin of a reaction product of a polymer such as polyacrylic acid or polymethacrylic acid with a basic compound to impart hydrophilicity.

(4) A crosslinked resin of a reaction product of a copolymer of acrylic or methacrylic acid and a vinyl or vinylidene monomer as mentioned in (2) above with a basic compound to impart hydrophilicity.

Among the above described crosslinked high-swelling resins, particularly satisfactory results can be obtained in respect of the water absorptivity and the durability of the resultant watertight sealing material of the invention by use of a crosslinked resin prepared from a reaction product of a copolymer of isobutylene and maleic anhydride with a basic compound or a reaction product of polyacrylic acid with sodium hydroxide, i.e. sodium polyacrylate.

The above described high-swelling resin is used preferably in a powdery form by pulverization to have such a particle size distribution as to pass a screen of 20 mesh opening according to JIS Z8801 since a watertight sealing material prepared by use of the high-swelling resin in a coarser powdery form may exhibit unevenness in the expansion when swollen with water or may lose smoothness of the surface.

In the inventive water-swellable rubber composition or the watertight sealing material shaped thereof, the weight proportion of the high-swelling resin as the component (b) relative to the chloroprene rubber as the component (a) should be in the range from 5 to 300 parts by weight or, preferably, from 30 to 200 parts by weight per 100 parts by weight of the component (a). When the amount of the component (b) is too small, the water-swellable rubber composition has a small capacity of water absorption so that the watertight sealing material shaped thereof followed by vulcanization cannot exhibit full performance of watertight sealing while an excessively large amount of the component (b) relative to the component (a) results in an undue decrease of the mechanical strengths of the sealing material when it is swollen with water.

When the sealing material used for watertight sealing in a joint is prepared by shaping and vulcanizing a rubber composition composed of a chloroprene rubber as the component (a), a high-swelling resin as the component (b) and a metal oxide-based vulcanizing agent as is the case in the prior art, there is usually no problem of water leakage since the sealing material is expanded by swelling with water intruding through the sealed part of joint to fill the interstice with a swelling pressure sufficient for watertight sealing resistant against a considerably large hydraulic pressure from outside or inside. When the sealing material undergoes a considerably large compression, however, as is frequently the case when concrete blocks provided with a covering layer of the sealing material on the joint surface are conjunctively joined together, the sealing material may lose the water-swellability so that the watertight sealing cannot be complete to cause leakage of water.

In contrast to the above described conventional watertight sealing materials, the inventive watertight sealing material is prepared with a water-swellable rubber composition comprising, in addition to the above mentioned components (a) and (b), a component (c) which is a rubbery material not vulcanizable with a metal oxide-based vulcanizing agent and shaped and vulcanized with a metal oxide-based vulcanizing agent. Quite unexpectedly, such a shaped and vulcanized material has been found to have a sufficiently large capacity of water absorption even when the material has been compressed prior to swelling with water. In other words, the swelling retention, which is the ratio of the swelling ratio by weight of a compressed material to the swelling ratio by weight of the uncompressed material, is unexpectedly large when the material is formulated with the component (c). Further advantageously, the mechanical strengths and flexibility of the material are little affected by the formulation of the component (c).

When a rubbery component covulcanizable with the component (a), i.e. a chloroprene rubber or a rubbery polymer vulcanizable by itself with a metal oxide-based vulcanizing agent is formulated in the water-swellable rubber composition in place of the above mentioned component (c), i.e. a rubbery polymer not vulcanizable with a metal oxide-based vulcanizing agent, the resultant rubber composition has an increased elastic modulus after vulcanization to prevent swelling of the high-swelling resin as the dispersed phase in the rubbery matrix when the watertight sealing material is brought into contact with water resulting in a decrease in the swelling ratio of the water-swellable rubber composition. This is the reason for the essential condition that the component (c) should not be vulcanizable when vulcanization is performed with a metal oxide-based vulcanizing agent.

In this regard, the rubbery polymer suitable as the component (c) is exemplified by polybutenes, polyisobutylenes, polybutadienes, polyisoprenes, natural rubber, butyl rubbers, SBR (styrenebutadiene rubber), NBR (nitrilebutadiene rubber), EPDM (a terpolymer elastomer made from ethylene-propylene diene monomer), EPT (ethylene propylene rubber), SIS (a rubbery block copolymer composed of polystyrene segments and polyisobutylene segments) and the like. These rubbery polymers may be in the form of liquid or solid at room temperature and two kinds or more thereof may be used in combination according to need.

The proportion of the component (c) relative to the other components is of importance in the formulation of the water-swellable rubber composition since no satisfactory resistance against compression can be obtained in a rubber composition formulated with a too small amount of the component (c) while a rubber composition formulated with an excessively large amount of the component (c) has decreased mechanical strengths so that no practically useful watertight sealing material can be obtained. In this regard, the amount of the component (c) should be in the range from 3 to 100 parts by weight or, preferably, from 5 to 50 parts by weight per 100 parts by weight of the chloroprene rubber as the component (a).

The above described components (a), (b) and (c) are the essential polymeric components in the inventive water-swellable rubber composition and the inventive watertight sealing material should be prepared by shaping and vulcanizing the rubber composition so that the rubber composition is necessarily formulated with a vulcanizing agent which is effective to the component (a) but ineffective to the component (c) as is understood from the above description. Such a vulcanizing agent as the component (d) is a metal oxide-based one which is preferably a combination of magnesium oxide and zinc oxide in view of the workability of the rubber composition, velocity of vulcanization, physical properties of the vulcanizates and other factors. The weight proportion of magnesium oxide to zinc oxide should be in the range of 2–6:3–7 or, preferably, 3–5:4–6. The total amount of these two metal oxides should be determined naturally in consideration of the desired velocity of vulcanization but an amount of 7 to 12 phr is usually satisfactory.

The inventive water-swellable rubber composition essentially comprises the above described components (a) to (d) but it is optional that the rubber composition further comprises other additives and processing aids conventionally used in the fabrication of the chloroprene rubber including, for example, vulcanization accelerators, vulcanization aids, aging retarders, reinforcing fillers such as carbon black, finely divided silica filler, clay and the like, non-reinforcing fillers such as calcium carbonate and the like, softener agents such as process oils and the like, plasticizers such as phthalates, sebacates and the like and coloring agents such as pigments and dyes. When a process oil is used, in particular, it should be noted that the use of a process oil in a decreased amount in comparison with the amount for full softening with an increase in the amount of the component (c) instead has an effect to increase the expansion of the inventive watertight sealing material in a plate-like form in the direction of the thickness, i.e. in the direction perpendicular to the surface, while the use of a process oil in an increased amount with a corresponding decrease of the component (c) instead has an effect of increasing the expansion of a watertight sealing material in a plate-like form within the plane of the material. This unique phenomenon can be utilized to adequately and anisotropically control the swelling performance of the inventive watertight sealing material.

The above described water-swellable rubber composition or the watertight sealing material prepared by shaping and vulcanizing the rubber composition has good mechanical strengths and, different from conventional watertight sealing materials of the similar types, the swelling ratio with water is little affected by the compression of the material in a dry condition. Therefore, the inventive watertight sealing material is useful as a sealing material of the joints in the construction works with prefabricated culvert boxes, sealed segments and other molded bodies of concrete, sealing material in the construction joint of concrete works and sealing material in metal-made structured bodies as well as sealing materials in a variety of repair works where watertight sealing is essential.

In the following, the inventive water-swellable rubber composition and the watertight sealing material of the invention are described in further detail by way of examples together with some comparative examples. In the examples and comparative examples, the swelling ratio and the value of swelling retention by compression of the materials were determined at 25° C. according to the procedures given below.

Test pieces of each 2 cm by 2 cm wide were prepared by cutting the water-swellable rubber sheet of 2.8 mm thickness and the weight of each test piece was determined as prepared and after dipping in water for 7 days as such or after keeping under compression for 3 hours in a hydraulic press with a reduced thickness of 1 mm followed by dipping in water for 7 days as released from compression. The swelling ratio is given by the ratio of the weight of the material swollen with water to the weight of the same test piece in the dry condition before dipping in water and the value of swelling retention in % is given by the ratio of the swelling ratio of the test piece dipped in water after compression to the swelling ratio of the test piece dipped in water without compression multiplied by 100.

In the following description, parts are all refer to parts by weight.

EXAMPLE 1.

A blend composed of 100 parts of a chloroprene rubber (Skyprene-20, a product by Toyo Soda Kogyo Co.), 4 parts of magnesium oxide (Kyowamag #150, a product by Kyowa Kagaku Kogyo Co.), 5 parts of an active zinc oxide (Zinca 10, a product by Sakai Kagaku Kogyo Co.), 0.5 part of 2-mercaptoimidazoline as a vulcanization accelerator (Sanceler 22, a product by Sanshin Kagaku Kogyo Co.), 1.0 part of stearic acid, 2.0 parts of 2,2'-methylenebis(4-methyl-6-tert-butylphenol) as an aging retarder (Nocrack NS-6, a product by Ouchi-Shinko Kagaku Kogyo Co.) and 80 parts of a high-swelling resin (KI Gel 201, a product by Kuraray Isoprene Chemical Co.) which is a crosslinked material of a reaction product of an isobutylene-maleic anhydride copolyner with sodium hydroxide and capable of absorbing 200 times of its own weight of water was further admixed with 1, 2, 3, 4 or 5 parts of a liquid polyisoprene (Kuraprene LIR-30, a product by Kuraray Isoprene Chemical Co.) unvulcanizable with the metal oxide-based vulcanizing agent, which was a combination of 4 parts by weight of magnesium oxide and 5 parts by weight of zinc oxide in this case, and milled in a 10-inch test roller for 20 minutes followed by sheeting into a sheet of a rubber compound having a thickness of 3.5 mm.

The above prepared rubber sheet was vulcanized in a hydraulic press at 160° C. for 30 minutes to give a vulcanized water-swellable rubber sheet having a thickness of 2.8 mm. The swelling ratio and the value of swelling retention by compression were determined with these rubber sheets with different amounts of the polyisoprene fornulation to give the results shown in Table 1 below.

TABLE 1

| Example No. | Unvulcanizable rubber Type | Parts | Swelling ratio Without compression | After compression | Swelling retention, % |
|---|---|---|---|---|---|
| 1 | Polyisoprene | 1 | 8.0 | 1.5 | 19 |
|   |   | 2 | 9.5 | 4.8 | 51 |
|   |   | 3 | 9.9 | 6.4 | 61 |
|   |   | 4 | 10.6 | 8.4 | 79 |
|   |   | 5 | 12.1 | 10.6 | 88 |
| 2 | Butyl rubber | 5 | 10.7 | 7.3 | 68 |
|   |   | 20 | 11.8 | 11.1 | 94 |
|   |   | 80 | 11.7 | 12.1 | 103 |
| 4 | Polyisobutylene | 5 | 20 | 16.7 | 84 |
|   |   | 10 | 17.6 | 16.2 | 92 |
|   |   | 30 | 15.4 | 14.8 | 96 |
|   |   | 50 | 16.4 | 16.3 | 99 |

EXAMPLE 2

The same experimental procedure as in Example 1 was repeated except that the formulation of the liquid polyisoprene was omitted and, instead, 5, 20 or 80 parts of a butyl rubber (Esso Butyl 268, a product by Exon Chemical Co.) were admixed to the rubber blend. Table 1 also includes the results obtained by the determination of the swelling ratio and the swelling retention of these water-swellable rubber sheets.

Example 3

The same experimental procedure as in Example 1 was repeated except that the formulation of the liquid polyisoprene was omitted and, instead, each 30 parts of various kinds of rubbery polymers unvulcanizable with the metal oxide-based vulcanizing agent as shown below for the rubber compounds No. 1 to No. 10 were admixed to the rubber blend. The results of the determination of the swelling ratio and the swelling retention are shown in Table 2 below.

Rubber compound No. 1: polyisoprene rubber (Kuraprene IR-10, a product by Kuraray Isoprene Chemical Co.), molecular weight 900,000

Rubber compound No. 2: the same polyisoprene as above after mastication, molecular weight 400,000

Rubber compound No. 3: butyl rubber (Butyl 5000-NS, a product by Cities Service Co.), molecular weight 450,000

Rubber compound No. 4: SBR rubber (SBR 1204, a product by Japan Synthetic Rubber Co.)

Rubber compound No. 5: EPT rubber (Mitsui EPT 4045, a product by Mitsui Sekiyu Kagaku Co.)

Rubber compound No. 6: A block-copolymeric rubber of styrene and isoprene (Carriflex 1107, a product by Shell Chemical Co.)

Rubber compound No. 7: liquid polyisobutylene (Vistanex LM-MS, a product by Exon Chemical Co.), molecular weight 35,000

Rubber compound No. 8: polyisobutylene rubber (Vistanex MML-80, a product by Exon Chemical Co.), molecular weight 990,000

Rubber compound No. 9: polyisobutylene rubber (Vistanex MML-120, a product by Exon Chemical Co.), molecular weight 1,600,000

Rubber compound No. 10: polyisobutylene rubber (Vistanex MML-140, a product by Exon Chemical Co.), molecular weight 2,100,000

TABLE 2

| Rubber compound No. | Swelling ratio Without compression | Swelling ratio After compression | Swelling retention, % |
|---|---|---|---|
| 1 | 11.9 | 10.7 | 90 |
| 2 | 12.4 | 11.8 | 90 |
| 3 | 11.3 | 11.0 | 97 |
| 4 | 10.6 | 10.3 | 97 |
| 5 | 11.8 | 11.4 | 97 |
| 6 | 9.7 | 6.1 | 63 |
| 7 | 13.7 | 13.2 | 96 |
| 8 | 11.0 | 10.3 | 94 |
| 9 | 11.0 | 10.4 | 95 |
| 10 | 11.2 | 10.0 | 89 |

EXAMPLE 4

Substantially the same experimental procedure as in Example 1 was repeated except that the amount of the high-swelling resin was increased to 140 parts and further additives of 30 parts of a process oil (Sunsen #4240, a product by Nippon Sun Sekiyu Co.) and 10 parts of white factice (a product by K.K. Nagai Seiyakusho) were admixed with replacement of the liquid polyisoprene with 5, 10, 30 or 50 parts of a polyisobutylene rubber Vistanex MML-140 (see Example 3). The time for milling of the rubber blend in the test roller was increased to 25 minutes. The results of the determination of the swelling ratio and the swelling retention for each of the water-swellable rubber sheets are shown in Table 1.

EXAMPLE 5

Substantially the same experimental procedure as in Example 1 was repeated except that the amounts of the vulcanization accelerator and the high-swelling resin were increased to 1 part and 100 parts, respectively, and a further additive of 20 parts of the same process oil as used in Example 4 was admixed with replacement of the liquid polyisoprene with 10 parts of a liquid polybutene (Polybutene HV 300, a product by Nippon Sekiyu Co.). The thus obtained water-swellable rubber conpound in the sheet-like form had swelling ratios of 16.2 and 11.6 before and after compression, respectively, to give a swelling retention of 72%.

The above prepared water-swellable rubber compound and a non-swellable rubber compound, composed of 100 parts of the chloroprene rubber, 4 parts of the magnesium oxide, 5 parts of the active zinc oxide, 2 parts of the vulcanization accelerator, 0.5 part of stearic acid, 3 parts of the aging retarder, 16 parts of the process oil, 50 parts of a carbon black and 30 parts of a calcium carbonate filler, were shaped and vulcanized by the techniques of co-extrusion using a double extruder of 60 mm and 70 mm diameters into a laminated rubber strip of 20 mm wide and 3 mm thick composed of the layers of the swellable and non-swellable rubber compounds each having a thickness of 1.5 mm. This laminated rubber strip was dipped and kept in water for 6 months without the phenomenon of peeling between the layers.

Further, the above prepared water-swellable rubber composition was shaped and vulcanized using the 60 mm extruder, which was a part of the above used double extruder, into a sheet of a single layer. After full swelling with water, this rubber sheet was folded to find that no cracks were formed in the portion usually called a weldline.

EXAMPLE 6

The same experimental procedure as in Example 5 was repeated except that the liquid polybutene was replaced with the same amount of the polyisobutylene rubber Vistanex MML-140 (see Example 3). The swelling ratio of the thus prepared water-swellable rubber sheet was 14.0 and 9.9 before and after compression, respectively, to give a value of swelling retention of 68%.

The above prepared water-swellable rubber compound and the same non-swellable rubber compound used in Example 5 were shaped into a laminated rubber strip in the same manner as in Example 5 and dipped and kept in water to find that peeling took place after 24 hours. Further, a single layer rubber sheet prepared of the above prepared water-swellable rubber compound was dipped in and fully swollen with water followed by folding to find that cracks were formed along the weldline.

COMPARATIVE EXAMPLE 1

A water-swellable rubber sheet was prepared with the same formulation as in Example 1 excepting the omission of the liquid polyisoprene. The swelling ratio of this water-swellable rubber sheet was 7.6 and 1.9 before and after compression, respectively, to give a value of swelling retention of 25%.

COMPARATIVE EXAMPLE 2

A water-swellable rubber sheet was prepared with the same formulation as in Example 1 except that the liquid polyisoprene was omitted and 10 parts of the same process oil as used in Example 4 were admixed instead. The swelling ratio of this water-swellable rubber sheet was 6.8 and 2.0 before and after compression, respectively, to give a value of swelling retention of 29%.

What is claimed is:

1. A water-swellable rubber composition which comprises:
    (a) 100 parts by weight of a chloroprene rubber;
    (b) from 5 to 300 parts by weight of a highly water-absorptive resin;
    (c) from 3 to 100 parts by weight of a rubbery polymer; and
    (d) a metal oxide-based vulcanizing agent which vulcanizes the chloroprene rubber but does not vulcanize the rubbery polymer.

2. A watertight sealing material which is a shaped and vulcanized body of a water-swellable rubber composition comprising:
    (a) 100 parts by weight of a chloroprene rubber;
    (b) from 5 to 300 parts by weight of a highly water-absorptive resin;

(c) from 3 to 100 parts by weight of a rubber polymer; and (d) a metal oxide-based vulcanizing agent which vulcanizes the chloroprene rubber but does not vulcanize the rubbery polymer.

3. The water-swellable rubber composition as claimed in claim 1 wherein the highly water-absorptive resin is a polymer selected from the group consisting of polyacrylic acid, polymethacrylic acid and copolymers of maleic anhydride with a vinylic compound in the form of a salt with an alkali metal, an alkaline earth metal, ammonium or an amine and crosslinked by reacting with a crosslinking agent.

4. The water-swellable rubber composition as claimed in claim 3 wherein the crosslinking agent is a polyvalent epoxy compound or a polyamine.

5. The water-swellable rubber composition as claimed in claim 1 wherein the highly water-absorptive resin has a capacity of water absorption in the range from 10 to 500 times of the dry weight thereof.

6. The water-swellable rubber composition as claimed in claim 1 wherein the highly water-absorptive resin is in a particulate form having a particle size distribution to pass a screen of 20 mesh opening.

7. The water-swellable rubber composition as claimed in claim 1 wherein the rubbery polymer is selected from the group consisting of polybutenes, polyisobutylenes, polybutadienes, polyisoprenes, natural rubber, butyl rubbers, SBR, NBR, EPDM, EPT and SIS.

8. The water-swellable rubber composition as claimed in claim 1 wherein the metal oxide-based vulcanizing agent is a combination of magnesium oxide and zinc oxide.

9. The water-swellable rubber composition as claimed in claim 3 wherein the vinylic compound is a compound of ethylene, propylene, isobutylene, 1-butylene, diisobutylene, methyl vinyl ether, styrene, vinyl acetate, acrylic esters, methacrylic esters, acrylonitrile, vinyl chloride, or vinylidene chloride.

10. The water-swellable rubber composition as claimed in claim 7 wherein the metal oxide-based vulcanizing agent is a combination of magnesium oxide and zinc oxide.

11. The water-swellable material as claimed in claim 2 wherein the rubbery polymer unvulcanizable with a metal oxide-based vulcanizing agent is selected from the group consisting of polybutenes, polyisobutylenes, polybutadienes, polyisoprenes, natural rubber, butyl rubbers, SBR, NBR, EPDM, EPT and SIS.

12. The water-swellable rubber composition as claimed in claim 11 wherein the metal oxide-based vulcanizing agent is a combination of magnesium oxide and zinc oxide.

* * * * *